United States Patent
Kobayashi et al.

[15] 3,687,026
[45] Aug. 29, 1972

[54] LIGHT REFLECTIVE SHUTTER CONTROL APPARATUS

[72] Inventors: Tatsuo Kobayashi, Kaizuka; Hiroshi Ueda, Nara, both of Japan

[73] Assignee: Minolta Camera Co., Ltd., Osaka-shi, Osaka-fu, Japan

[22] Filed: Nov. 13, 1970

[21] Appl. No.: 89,406

[30] Foreign Application Priority Data

Nov. 15, 1969 Japan ..................... 44/91576

[52] U.S. Cl. ................... 95/10 CT, 95/42, 95/53 EB, 95/57
[51] Int. Cl. ........................... G03b 7/08, G03b 9/18
[58] Field of Search ........ 95/10 C, 10 CE, 10 CT, 42, 95/53 R, 53 E, 53 EA, 53 EB, 57

[56] References Cited

UNITED STATES PATENTS

| | | |
|---|---|---|
| 3,442,190 | 5/1969 | Erickson ................. 95/10 CT |
| 3,124,049 | 3/1964 | Ball ........................ 95/10 CT |
| 3,336,850 | 8/1967 | Takao Otani et al. ... 95/10 CT |
| 3,468,233 | 9/1969 | Schmidt ......................... 95/42 |
| 3,353,462 | 11/1967 | Nobuo Suzuki ......... 95/10 CT |

*Primary Examiner*—Joseph F. Peters
*Attorney*—Watson, Cole, Grindle & Watson

[57] ABSTRACT

A light scattering surface is mounted facing the objective lens to direct light to a photoelectric detector during movement of a shutter curtain so that shutter control is provided during the exposure. An integrating circuit formed by a condenser and the photoelectric detector actuate a switching circuit to control movement of a second shutter curtain to terminate the exposure.

7 Claims, 10 Drawing Figures

Patented Aug. 29, 1972

INVENTOR
Tatsuo Kobayashi
Hiroshi Ueda
BY Watson, Cole, Grindle & Watson
ATTORNEY

INVENTOR
Tatsuo Kobayashi
Hiroshi Ueda
BY Watson, Cole, Grindle & Watson
ATTORNEY

INVENTOR
Tatsuo Kobayashi
Hiroshi Ueda
BY Watson, Cole, Grindle & Watson
ATTORNEY

A LIGHT REFLECTIVE SHUTTER CONTROL APPARATUS

The present invention relates to a light reflective shutter control for a camera which operates even during exposure.

BACKGROUND OF THE INVENTION

The present invention provides an exposure control device for a photographic camera and more particularly to an exposure control device for receiving light passing through the objective lens and reflected at a light scattering surface provided on a shutter curtain driven for initiating exposure of a light sensitive surface. In the prior art a light receiving element is disposed to intercept the picture image light ray passing through the objective lens to effect exposed control. However, just before the starting of an exposure the light is not measured and the light value just prior to exposure is used for exposure control. In a single lens reflex camera a light receiving element is disposed on a movable mirror or a light receiving element is fixed in a finder optical system reflected by the movable mirror, therefore, in both cases the exposure control during an exposure is impossible because the movable mirror turns just before the exposure and accordingly the exposure must be controlled on the basis of the stored light value.

There, a memory device for memorizing the light value, for example, a circuit provided with a memory condenser is required, and further a change over device for changing over the memory device from normal exposure to the exposure control is required. The exposure control device of the camera becomes complicated and in addition between the photometric time and the exposure time in field photography, when there is a change in the brightness of an object, for example, when the intensity of illumination undergoes a change, when there is a flashing of light in the field, or when taking a flash photograph, the exposure is in error. Besides, in a type camera wherein a light receiving element is transferred from the inside to the outside of the camera depending on the photometric time and the exposure time the camera shakes due to the inertia caused by the transference.

OBJECT OF THE INVENTION

One object of the present invention is to provide a camera having an exposure control device with light passing through the objective lens (TTL), which eliminates the prior drawbacks mentioned above, and can control an exposure during an exposure.

Another object of the present invention is to provide a camera having TTL exposure control, which equalizes the reflection factor of the light passing through the objective lens on the first screen of a focal plane shutter prior to exposure to the reflection factor of the sensitive film to while in exposure.

Further another object of the present invention is to provide a single lens reflex camera having a TTL exposure control device, which starts photometry simultaneously with the turning of the movable mirror and continues to measure light even while the exposure is made.

Other objects and advantages of the present invention will be evident from the embodiment described hereinafter.

SUMMARY OF THE PRESENT INVENTION

In order to attain the abovementioned objects in a camera for effecting TTL photometry, the present invention provides a camera which measures the reflection power of the photographic film and is so constructed that a light receiving element is mounted on the outside of the picture image light ray passing through the objective lens and facing the sensitive film surface, thereby, equalization is obtained between the reflection factor with the opening screen for the focal plane shutter facing light receiving element and the reflection factor of the exposed sensitive film surface. The operation of the opening screen and the measuring of the reflected ray from the opening screen and the reflected ray from the exposed sensitive film surface eliminates changes in the light projected to the light receiving element caused by movement of the opening screen. The brightness of an object is correctly determined and the exposure automatically controlled.

DESCRIPTION OF THE EMBODIMENT

Figure 1:
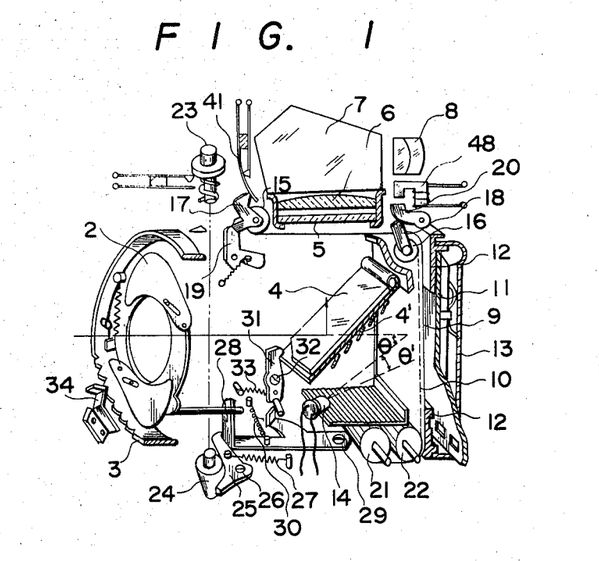
FIG. 1 is a perspective view in a longitudinal section showing the formation of the essential portion of an embodiment of a single reflex camera in accordance with the present invention.
Figure 2:
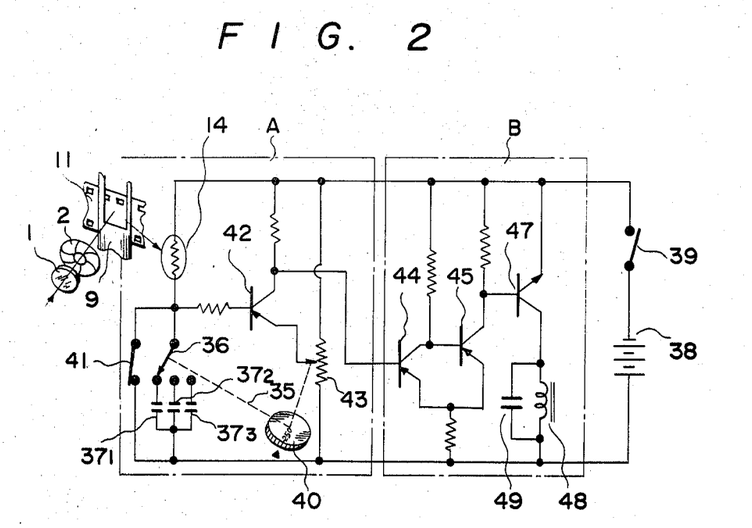
FIG. 2 shows the electric control circuit in the embodiment.

FIG. 1 shows an embodiment in which the present invention is put to use for a single reflex camera, wherein diaphragm blade 2 is held by preset diaphragm device 3 in the lens barrel provided on the front of the camera body, and disposed on the pupil position of lens 1 not shown in FIG. 1 but shown in FIG. 2. Numeral 4 is a movable mirror held on turning plate 4', which is always in a sloping position at 45° as shown in FIG. 1 and reflects the light ray incident from lens 1 to direct it to focusing glass 5 to adjust the focus. The image on focusing glass 5 is projected toward eyepiece 8 via condenser lens 6 and pentagonal prism 7.

The conical face 24 of release button 23 engages with release lever 25 supported on the camera body at pin hole 26 and has a clockwise turning tendency from spring 27. Preset diaphragm restraining lever 28 for engaging with release lever 25 to turn it counterclockwise against the spring force is supported rotatably on the camera body at pin hole 29 and has a clockwise turning tendency from spring 30. And, when disengaged from release lever 25 restraining lever 28 turns to stop down diaphragm 2 from a completely open position to the set up diaphragm value effected by restraining member 34 of preset diaphragm device 3.

When preset diaphragm restraining lever 28 turns it runs into mirror restraining lever 31. Mirror restraining lever 31 is supported rotatably on the camera body at pin hole 32 and has a clockwise turning tendency from spring 33, and retains engagement with turning plate 4' at a sloping position at an angle of 45°. However, when struck by preset diaphragm restraining lever 28 mirror restraining lever 31 turns counterclockwise to release movable mirror 4. Movable mirror 4 turns clockwise to a horizontal position through a spring not shown in the drawing.

Therefore, the picture image light ray on lens 1 is projected onto opening screen 9 for the focal plane shutter which is still closing.

Light receiving element 14 is disposed on the rear of movable mirror 4, facing the exposure window of exposure frame 12 and being out of the optical path of the picture image light ray on lens 1. Therefore, when movable mirror 4 is turned to the horizontal position as described above the reflected ray effected by opening screen 9 located to screen the exposure opening comes into light receiving element 14 which takes a resistance value corresponding to the intensity of the reflected ray.

At the final stroke of the turning of movable mirror 4 to the horizontal position, turning plate 4' comes into contact with opening screen restraining lever 19 to turn it counterclockwise so that opening screen pawl 17, integral with opening screen winding drum 15, is disengaged from opening screen restraining lever 19 and opening screen 9 starts to move by being driven by take-up drum 21. Simultaneously opening screen pawl 17 opens timing switch 41.

As opening screen 9 starts to move sensitive film 11 is exposed to the picture image light ray effected by lens 1 and the reflected ray from the sensitive face of sensitive film 11 is reflected onto light receiving element 14.

The measured results of the reflection factor of sensitive films on the market are shown in the following table:

| ASA | Designation of film | | ASA | Designation of film | |
|---|---|---|---|---|---|
| 6 | Agepan | 27 | | Adox KB21 | 31 |
|  | Agepe | 29 | | Agfapan | 26 |
| 25 | Agfa IsopunFF | 24 | | Minori-pan | 31 |
|  | Kodachrome II | 26 | 100 | Sakura-Color N100 | 27 |
|  | Panatomic X | 23 | | Sakura-Color R100 | 28 |
| 32 | Neopan F | 28 | | Fuji-Color N100 | 24 |
|  | Gevapan Dia | 23 | | Fuji-Color R100 | 26 |
|  | Coni-Pan reversal | 30 | | Ilford FP4 | 30 |
| 40 | Isopan IF | 26 | 125 | Plus X | 29 |
|  | Adox KB17 | 28 | | Kodak EHB | 30 |
|  | Pan-film 17 | 25 | 160 | Kodak EH | 27 |
|  | Agfacolor CT18 | 28 | 200 | Neopan SSS | 30 |
| 50 | Agfachrome 50S | 27 | | Koni-Pan SSS | 31 |
|  | Agfachrome 50L | 29 | 250 | Gevapan 33 | 29 |
| 64 | Extachrome X | 29 | | Tri X | 28 |
|  | Kodachrome X | 26 | | Agepan 400 | 27 |
|  | Agfacolor CNS | 30 | 400 | Isopan Ultra | 28 |
| 80 | Kodacolor X | 29 | | Orwo NP27 | 30 |
|  | Agfacolor CK36 | 28 | | Ilford HP4 | 30 |
|  | Neopan SS | 29 | 800 | Kodak Recording | 31 |
| 100 | Koni-pan SS | 31 | 1,000 | Agepan 1000 | 26 |
|  | Isopan ISS | 26 | 1,250 | Isopan Record | 29 |

As seen in the above measured results, the reflection powers are distributed in a narrow range from 23 to 31 percent and the spectral reflection powers are nearly uniform within the visible wave lengths, even with respect to very sensitive material. Therefore, by making use of light receiving element 14 having a spectral sensitivity approximately equal to the visible sensitivity it is possible to detect the light of an object through the reflected ray from the surface of the sensitive material.

On the other hand, screens for the focal plane shutter in the prior art are made of a black rubbered cloth, a black coloring cloth, or such metal screens as titanium-stainless, or an aluminum alloy coated with a black thin film of silicon varnish, teflon or another synthetic resin, natural rubber, or synthetic rubber. The reflection factors thereof are from 3 to 4 percent, and accordingly it is almost impossible to detect the brightness of an object through the reflected ray thereof and control the exposure.

Therefore, in the present invention the reflection power at least on the side facing the side of lens 1 for opening screen 9 is finished to have a reflecting power from 23 to 31 percent. Therefore, the quantity of light of the picture image light ray reflected to come into light receiving element 14 remains almost unchanged even before opening screen 9 starts to move, also while moving, and further even after the movement is finished. And thus, light receiving element 14 is able to detect the light of an object and control the exposure in accordance with the detected value until closing screen 10 starts to move so as to finish the exposure.

Next, with reference to FIG. 2 showing the electric control circuit in the first embodiment, light receiving element 14, into which the reflected light ray through lens 1 and diaphragm 2 by opening screen 9 or sensitive material 11 comes, is connected in series to power source 38 and power switch 39 and connected also in series through change over switch 36 to one of condensers $37_1$, $37_2$, $37_3$ connected in parallel with each other. Timing switch 41 is connected in parallel with change over switch 36 and condensers $37_1$, $37_2$, $37_3$, and the node between light receiving element 14 and change over switch 36 is connected to the base of transistor 42 to form timer circuit A. And, variable resistance 43 is an emitter resistance of transistor 42 the resistance value of which is changed through film sensitivity set up dial 40 and the interlocking member shown in FIG. 2 changes condensers $37_1$, $37_2$, $37_3$. In the switching circuit shown by broken line B in FIG. 2, transistor 44 which receives the output of timer circuit A as an input forms a Schmidt trigger circuit together with transistor 45. To the collector of transistor 45 the base of amplifier transistor 47 is connected, and to the collector of amplifier transistor 47 electromagnet 48 for releasing the closing screen and condenser 14 are connected in parallel.

That is, just as the opening screen starts to move and timing switch 41 is opened as described above, with the current running through light receiving element 14 delay condenser $37_2$ (provided change over switch 36 is connected to condenser $37_2$ in accordance with the film sensitivity set up) starts to charge, and when the charging voltage gets to a certain set up voltage transistor 42 is actuated to operate switching circuit B and electromagnet 48 is excited.

Just as electromagnet 48 is excited closing screen restraining lever 20 is turned clockwise in FIG. 1 to release closing screen pawl 18, so that closing screen winding drum 16, integral to closing screen pawl 18, is released and the closing screen starts to move by being driven by closing screen take-up drum 21 and the shutter is closed.

Therefore, when the picture image is reflected by closing screen 10, the exposure control has been finished so that there is no need to increase the reflection factor of closing screen 10.

In the above embodiment, when the reflection power of opening screen 9 is 26.7 percent, the measuring error in the case where the sensitive material has the minimum reflection power (23 percent) and the sensitive material has the maximum reflection power (31 percent) is only ± 0.2 $E_v$ or so as compared with the case where a sensitive material having the same reflection power of 36.7 percent as opening screen 9 is put to use. Therefore, it is understood that all sensitive materials may be used.

Figure 3:
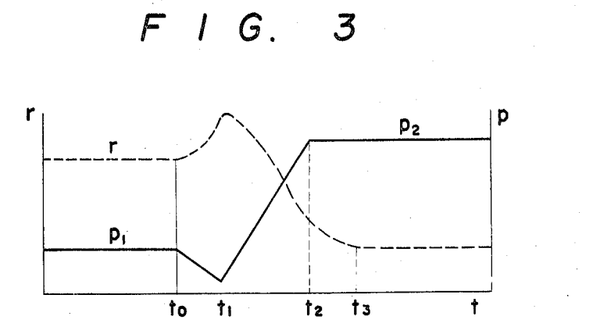
FIG. 3 is a diagram showing the variation in the light received of a light receiving element accompanied by the shutter release and the change of resistance thereof in the embodiment.

FIG. 3 shows the change of the quantity of light incident to light receiving element 14 and the change of the output thereof in the first embodiment, wherein $t_0$ denotes the time for pushing down the shutter release button, $t_1$ the time for finishing the preset diaphragming and $t_2$ the time for finishing the turning of the movable mirror. That is, before pushing down the shutter release button the picture image light ray is reflected by the movable mirror and the quantity $P_1$ of light incident to light receiving element 14 is very little. After the shutter release button is pushed down preset diaphragm device 3 operates and diaphragm 2 is stopped down from the complete opening state to the preset diaphragm value, and the quantity of light incident to light receiving element 14 is further reduced, however, then movable mirror 4 turns and the quantity of light is gradually increased, and when movable mirror 4 is completely up the quantity of light is that indicated at $P_2$. However, the light receiving element 14 has a special characteristic so that the output thereof attains the output corresponding to the change of quantity of incident light and follows the curve shown by r in FIG. 3, and reaches the output corresponding to the quantity $P_2$ of incident light at $t_3$. Therefore, when the photometry is started between $t_2$ and $t_3$ an error results. When a silicon charging element having a small time constant is used as the light receiving element 14 an error between $t_2$ and $t_3$ can be disregarded, however, when a conventional photoconductive element is used it can not disregarded.

Figure 4:
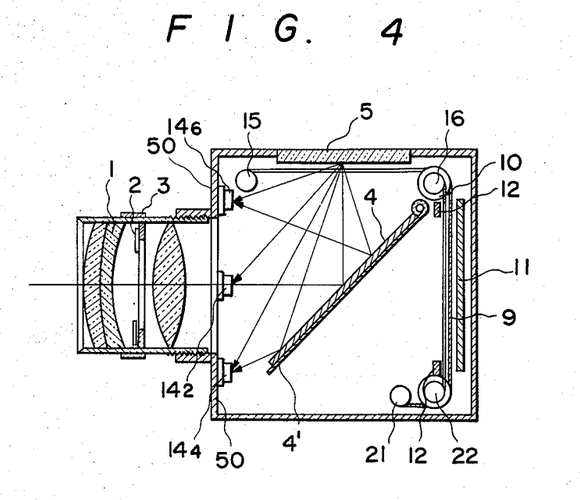
FIG. 4 is a side section view of another embodiment in accordance with the present invention.
Figure 5:
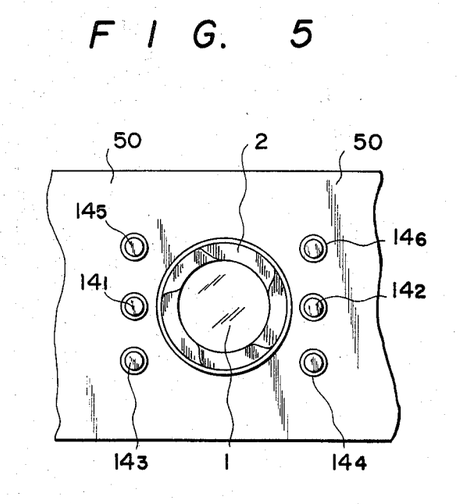
FIG. 5 is a front view of the inner wall of the camera in the embodiment of FIG. 4.

In the second embodiment shown in FIG. 4 the error due to the time lag of the light receiving element is designed to be reduced as far as possible.

Figure 6:
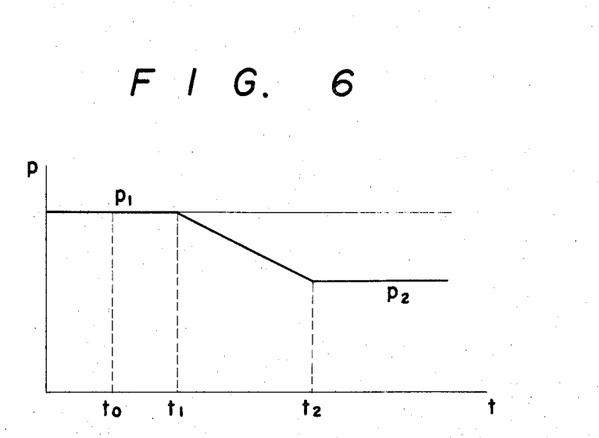
FIG. 6 is a diagram showing the variation in the light received by the light receiving element accompanied by the shutter release in the second embodiment.

That is, in the second embodiment, photoconductive elements $14_1$ to $14_6$ are disposed facing the exposure window to the internal face of front wall 50 and mounted on the front of movable mirror 4. In this manner, before pushing down the shutter release button, the picture image light ray reflected by movable mirror 4 goes toward focusing glass 5, however, a portion of the light ray is reflected by scattering to come directly or by being reflected by movable mirror 4 into photoconductive elements $14_1$ to $14_6$. The light received is about 1/20 of the ray reflected from the face of the sensitive material at the photographing time, however, at this juncture the diaphragm is in the complete opening state as a matter of course, so that the change of the light received is as shown in FIG. 6, and the whole change of light is little as compared with that of the first embodiment shown in FIG. 1 and it is possible to reduce the response delay of the photoconductive element.

Further, the reason why a plurality of photoconductive elements are put to use as shown in the second embodiment is to be able to look for the average intensity of illumination on the whole picture, that is, when only one photoconductive element is put to use it is affected comparatively strongly by the place in the focal plane near the photoconductive element so that an error results in case of an object wherein the distribution of the illumination on the focal plane is not uniform, however, by making use of a plurality of photoconductive elements it is possible to obtain the average intensity of illumination on the whole picture. Therefore, for this purpose two photoconductive elements $14_1$, $14_2$ or four photoconductive elements can be put to use, but if there are too many the above effect is saturated and a good result can not be obtained.

Figure 7:
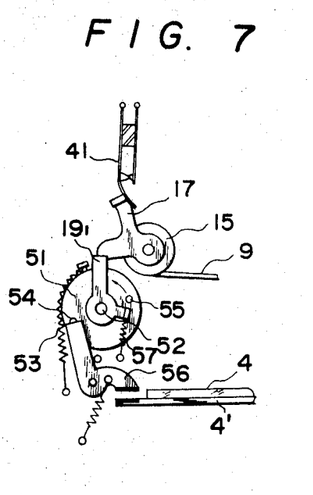
FIG. 7 is a partial cross section view of an example of the shutter release delay mechanism of the first embodiment shown in FIG. 1 in accordance with the present invention.

FIG. 7 shows another means for correcting the error due to the time lag of response using the photoconductive element as a light receiving element in the first embodiment, and instead of operating release of opening screen restraining lever 19 in a direct action as shown in FIG. 1, a member for effecting the delay action is provided therein. That is, opening screen restraining lever $19_1$ is mounted loosely on pin 52 provided on movable disk 51 and having a clockwise turning tendency by spring 57 to engage with opening screen pawl 7. Movable disk 51 has a turning tendency in the opposite direction to opening screen lever $19_1$ (counterclockwise) by spring 53 and on the face thereof restraining pin 54 and working pin 55 are provided. Intermediate lever 56 engageable with turning plate 4' has a clockwise turning tendency and engages with restraining pin 54 provided on movable disk 51 to restrain the rotation of movable disk 51 against spring 53. Working pin 55 for coming into contact with opening screen restrain lever $19_1$ to turn it counterclockwise against spring 57 has a certain gap from opening screen restrain lever $19_1$ when restraining pin 54 engages with intermediate lever 56. Therefore, after the turning of turning plate 4' is finished and light receiving element 14 has received the incident ray for a certain time, opening screen restraining lever $19_1$ disengages from opening screen pawl 17 and the opening screen is moved and timing switch 41 is opened. By making the time equal to said $t_3-t_2$ in FIG. 3 or larger than it, the exposure error due to the time lag of light receiving element 14 is completely removed.

Figure 8:
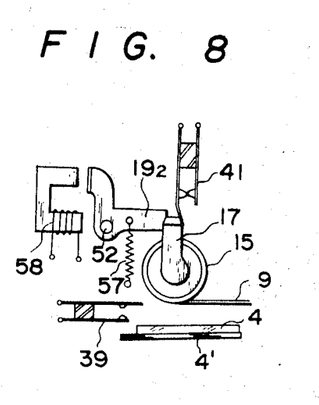
FIG. 8 is a partially cross section view of the second example of a delay mechanism.
Figure 9:
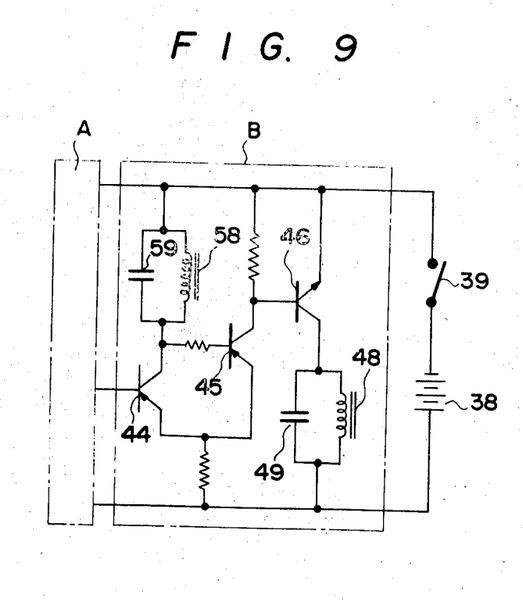
FIG. 9 shows the switching circuit provided with the control circuit for the delay mechanism.

In the embodiment shown in FIG. 8, the release of opening screen restraining lever $19_2$ is operated by electromagnet 58 which is inserted in parallel with condenser 59 in the collector circuit of the first transistor 44 in the Schmidt trigger circuit into which the output of timer circuit A is fed as shown in FIG. 9. Transistor 44 is actuated simultaneously with the closing of the power source switch and turned to the non-conductive state simultaneously with transistor 42 in timer circuit A (see FIG. 1) is reversed, so that when power switch 39 is closed by turning of turning plate 4' transistor 44 is actuated first to charge condenser 59, and when condenser 59 is charged after a certain time electromagnet 58 is excited to release the opening screen, so that by making the charging time of condenser 59 equal to $t_3-t_2$ it is possible to correct the lag of light receiving element 14.

Figure 10:
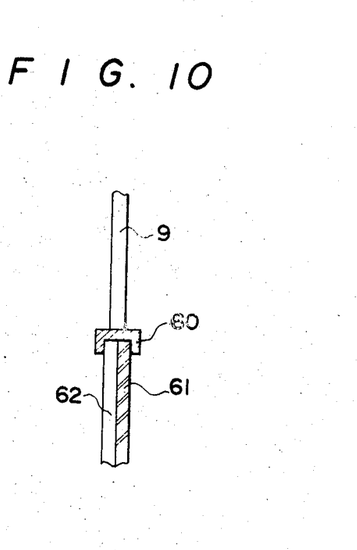
FIG. 10 is a side section view showing an example of the shutter screen in accordance with the present invention.

The means for increasing the reflection power of opening screen 9 to between 23 and 30 percent have been variously proposed and the surface of opening screen 9 need not be made a light diffusion face however, the illuminance for forming an image of an object is not uniform and the sensitivity characteristic of the light receiving angle of light receiving element 14 is not even, so that it is preferable that the shutter screen is made a light diffusion reflection surface having the same standard as the sensitive material. FIG. 10 shows an example of such a shutter screen, wherein screen portion 61 composed of a black screen of a sensitive material is coated with a resin layer of an opalescent color having a reflection factor between 23 and 31 percent and both ends thereof are fastened by black fastener 60 to prevent them from separating from each other.

Provided that sensitive material surface 11 and opening screen surface 9 are a complete diffusion surface and the illuminance of the picture image light ray is uniform, and using the first embodiment shown in FIG. 1 in the light receiving illuminance $E_s$ of light receiving element 1 is obtained from the following formula:

$$E_s = V_f \cdot S \cdot \cos\theta \cdot \cos\theta' \, E_f / \pi l^2$$

wherein, $V_f$ is the reflection power of the sensitive material surface and the opening screen surface, and assuming it to be 0.3. $S$ is the area of the exposure opening, and assuming it 24×36 mm². $\theta$ is the angle formed between the line connecting the center of the picture image light ray for forming an image to the light receiving element, and a perpendicular line to the center, and assuming it to be 30°. $\theta'$ is the angle formed between the axis of the angle with which the light receiving element receives the light and the line connecting the center of the picture image light ray for forming an image to the light receiving element, and assuming it to be 0°. 1 is the distance between the center of the exposure opening and the light receiving element, and assuming it to be 24$^{mm}$, and thus $E_f$ is the illuminance of the picture image light ray, so that when the respective value is put in appropriate position in the formula, the following formula is obtained:

$$E_s = 0.124 \, E_f$$

While, the result obtained by measuring in an embodiment in which reflection surface 62 of opening screen 9 is made a light diffusion surface the same standard as the sensitive surface of sensitive material 11 as shown in FIG. 10 is as follows:

$$E_s = 0.1 \, E_f$$

That is, both $E_s$ values are nearly the same and this fact shows that the sensitive material surface and the reflection surface of the opening screen are not necessary to be a complete diffusion surface.

Where a film such as a minicopy with an emulsion layer is very thin and the reflection power is as low as 16 percent is used as a sensitive material the transmission power is 25 percent or so, so that by making use of a film press-fit plate it is possible to compensate the reflected light ray from the film surface.

As described above, the present invention can be applied to almost all of the films on the market except infrared films especially those having a low reflection power.

And, in the present invention the arrangement of the sensitive materials for the opening and closing screens can be arranged at intervals between the opening screen and the light receiving element, and between the sensitive material and the light receiving element by disposing opening screen 9 on the side of sensitive material 11 and arranging closing screen 10 on the front of opening screen 9 as shown in FIG. 1, and accordingly the exposure control error can be reduced.

We claim:

1. A shutter control apparatus for a photographic camera, comprising:
    an objective lens;
    means having a light sensitive surface;
    a first shutter curtain for initiating exposure of said light sensitive surface and having a light scattering surface facing said objective lens, said light scattering surface having a reflecting power of between 23 and 31 percent;
    a second shutter curtain for terminating said exposure;
    an electric timing means for controlling said second shutter curtain and including,
    a photoelectric member for receiving light passing through said objective lens and reflected from said light scattering surface and/or said light sensitive surface,
    a condenser connected to said photoelectric member to form an integrating circuit,
    a switching circuit responsive to said integrating circuit; and
    an electromagnet driven by said switching circuit to actuate said second shutter curtain after a delay period determined by said integrating circuit.

2. A shutter control apparatus as in claim 1, wherein said reflecting power is 26.7 percent.

3. A shutter control apparatus as in claim 1, wherein said first shutter curtain is mounted closer to said light sensitive surface than said second shutter curtain.

4. A shutter control apparatus as in claim 1, further comprising:
    a view finder;
    a mirror movable between a viewing position for directing the light passing through the objective lens to said view finder and a retracted position for allowing the light to impinge on said light sensitive surface;
    a retaining member for retaining said first shutter curtain in a cocked position;
    means for releasing said first shutter curtain with said mirror in said retracted position; and
    delay means for delaying the operation of said means for releasing.

5. A shutter control apparatus as in claim 4, further comprising:
    a power switch for said electric timing means having a normally open position and a closed position with said mirror in said retracted position; and
    said means for releasing includes an electromagnet connected to said switching circuit and actuated by the closing of said power switch to release said retaining member.

6. A shutter control apparatus as in claim 4, wherein the photosensitive element is mounted between said mirror and said objective lens facing said light sensitive material.

7. A shutter control apparatus as in claim 6, further comprising a plurality of photoelectric elements facing said light sensitive surface.

* * * * *

UNITED STATES PATENT OFFICE
CERTIFICATE OF CORRECTION

Patent No. 3,687,026      Dated August 29, 1972

Inventor(s) Tatsuo Kobayashi; Hiroshi Ueda

It is certified that error appears in the above-identified patent and that said Letters Patent are hereby corrected as shown below:

[73]  Assignee:  Minolta Camera Kabushiki Kaisha,
                 Osaka-shi, Osaka-fu, Japan Signed and sealed this 1st day of January 1974.

(SEAL)
Attest:

EDWARD M. FLETCHER, JR.          RENE D. TEGTMEYER
Attesting Officer                Acting Commissioner of Patents